(12) United States Patent
Salazar

(10) Patent No.: US 7,004,698 B1
(45) Date of Patent: Feb. 28, 2006

(54) PICK-UP BED DIVIDING APPARATUS

(76) Inventor: Hilario Salazar, 10534 Stover, Houston, TX (US) 77075

(\*) Notice: Subject to any disclaimer, the term of this patent is extended or adjusted under 35 U.S.C. 154(b) by 0 days.

(21) Appl. No.: 10/972,315

(22) Filed: Oct. 25, 2004

(51) Int. Cl.
*B61D 45/00* (2006.01)
(52) U.S. Cl. .................................... 410/118; 276/37.6
(58) Field of Classification Search ............... 410/118, 410/117, 121, 122; 296/37.6; 160/135, 160/152, 160, 162, 165, 351, 352, 368.1, 160/369, 371, 377
See application file for complete search history.

(56) References Cited

U.S. PATENT DOCUMENTS

| | | | | |
|---|---|---|---|---|
| 651,075 | A | * | 6/1900 | Huffman ...................... 160/88 |
| 932,355 | A | * | 8/1909 | Thrasher et al. .............. 256/26 |
| 1,182,018 | A | * | 5/1916 | Koenig ......................... 256/25 |
| 2,275,942 | A | * | 3/1942 | Barry ........................... 16/366 |
| 2,835,223 | A | * | 5/1958 | Erickson ..................... 119/502 |
| 3,423,072 | A | * | 1/1969 | Bernstein ..................... 256/24 |
| 3,651,851 | A | * | 3/1972 | Curtis ......................... 160/135 |
| 4,290,602 | A | * | 9/1981 | Kennedy ..................... 472/94 |
| 4,526,347 | A | * | 7/1985 | McLoughlin ................ 256/33 |
| 4,722,646 | A | | 2/1988 | McIntyre |
| 4,772,165 | A | | 9/1988 | Bartkus |
| 4,917,429 | A | | 4/1990 | Giger |
| 5,207,260 | A | | 5/1993 | Commesso |
| 5,265,993 | A | | 11/1993 | Wayne |
| D348,421 | S | | 7/1994 | Dexter |
| 5,411,355 | A | | 5/1995 | Gosnell et al. |
| 5,427,486 | A | * | 6/1995 | Green ......................... 410/118 |
| 5,452,973 | A | * | 9/1995 | Arvin ......................... 410/118 |
| 5,586,850 | A | | 12/1996 | Johnson |
| 6,105,654 | A | * | 8/2000 | Martel ........................ 160/135 |
| 6,183,177 | B1 | * | 2/2001 | Dahlgren .................... 410/100 |
| 6,345,944 | B1 | * | 2/2002 | Florence ..................... 410/118 |
| 6,454,148 | B1 | * | 9/2002 | Cook .......................... 224/404 |
| 6,684,894 | B1 | * | 2/2004 | Zheng ......................... 135/126 |
| 6,688,821 | B1 | * | 2/2004 | Snyder ........................ 410/140 |
| 6,832,752 | B1 | * | 12/2004 | Cuzzocrea .................. 256/25 |
| 2002/0078989 | A1 | * | 6/2002 | Zheng ......................... 135/125 |
| 2003/0181264 | A1 | * | 9/2003 | Yoon ........................... 473/421 |

\* cited by examiner

*Primary Examiner*—H. Gutman

(57) ABSTRACT

A pick-up bed dividing apparatus includes a plurality of flexible panels each having a first side edge, a second side edge, a top edge and a bottom edge. Each of a plurality of loops extends through each of the panels adjacent to the first side edge such that the panels are pivotally coupled together. A plurality of hooks is provided. The hooks are each attached to one of the second side edges of the panels so that each of the second side edges has at least two hooks attached thereto. The hooks may be selectively attached to the bed such that compartments are defined between spaced ones of the panels.

10 Claims, 4 Drawing Sheets

PICK-UP BED DIVIDING APPARATUS

BACKGROUND OF THE INVENTION

1. Field of the Invention

The present invention relates to pick-up bed partition devices and more particularly pertains to a new pick-up bed partition device for selectively dividing a pick-up bed into a plurality of sections.

2. Description of the Prior Art

The use of pick-up bed partition devices is known in the prior art. U.S. Pat. No. 5,427,846 describes a device that can be used for dividing a pick-up bed into two sections and which is adapted for accommodating the contours of a wheel wells positioned in the pick-up bed. Another type of pick-up bed partition device is U.S. Pat. No. 4,917,429 having a plurality of rigid dividing walls that may be placed together and positioned within a pick-up bed to divide the pick-up bed into a plurality of compartments. Another such device, which utilizes rigid walls, is U.S. Pat. No. 5,265,993.

While these devices fulfill their respective, particular objectives and requirements, the need remains for a device that uses flexible walls while still providing a means of allowing the user of the device to determine the number and size of the compartments to be formed within a pick-up bed. The device should also be easily retrofitted to existing pick-up beds without concern of tie-down requirements.

SUMMARY OF THE INVENTION

The present invention meets the needs presented above by generally comprising a plurality of flexible panels each having a first side edge, a second side edge, a top edge and a bottom edge. Each of a plurality of loops extends through each of the panels adjacent to the first side edge such that the panels are pivotally coupled together. A plurality of hooks is provided. The hooks are each attached to one of the second side edges of the panels so that each of the second side edges has at least two hooks attached thereto. The hooks may be selectively attached to the bed such that compartments are defined between spaced ones of the panels.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed,to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
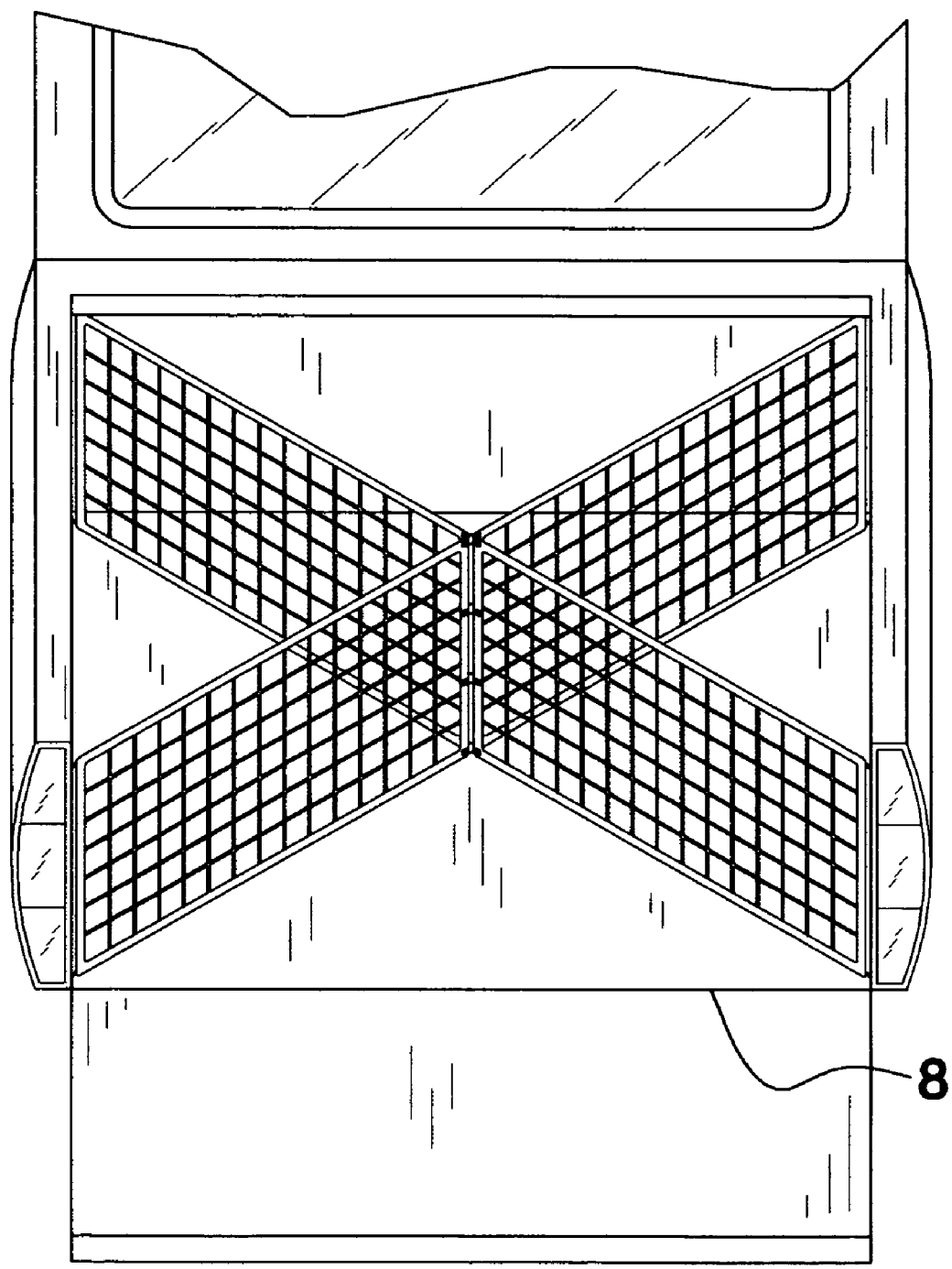
FIG. 1 is a perspective in-use view of a pick-up bed dividing apparatus according to the present invention.
Figure 2:
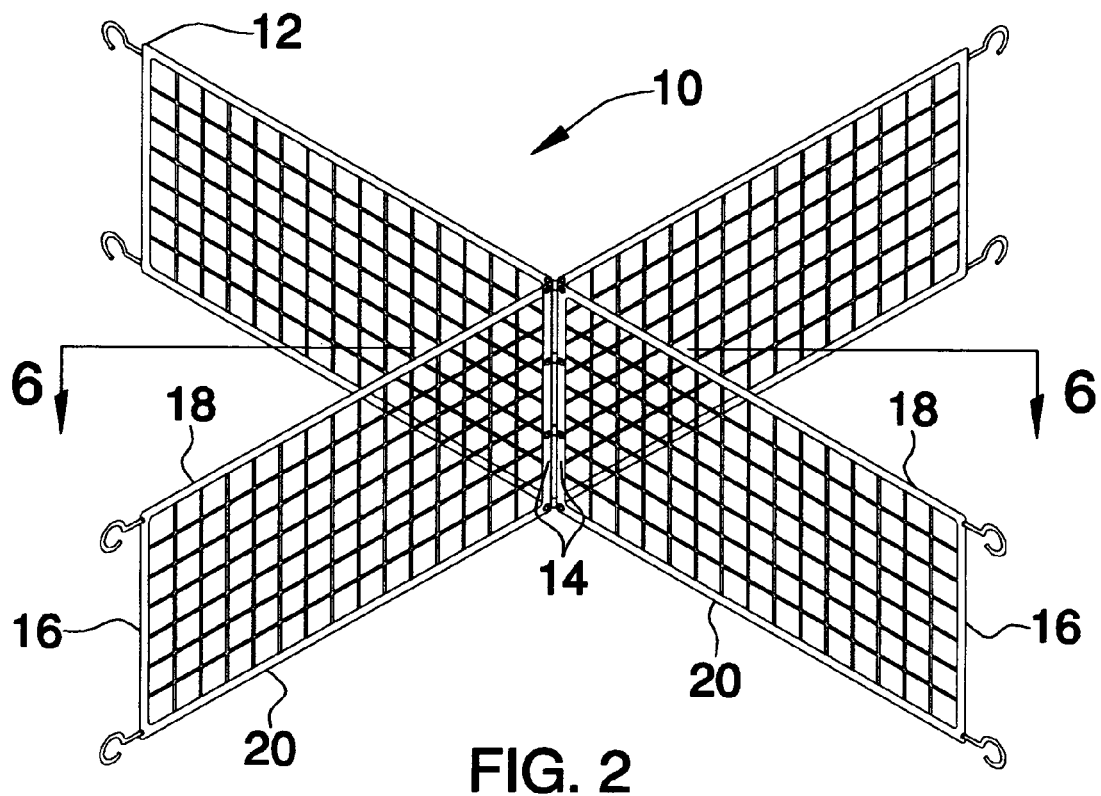
FIG. 2 is a perspective view of the present invention.
Figure 3:
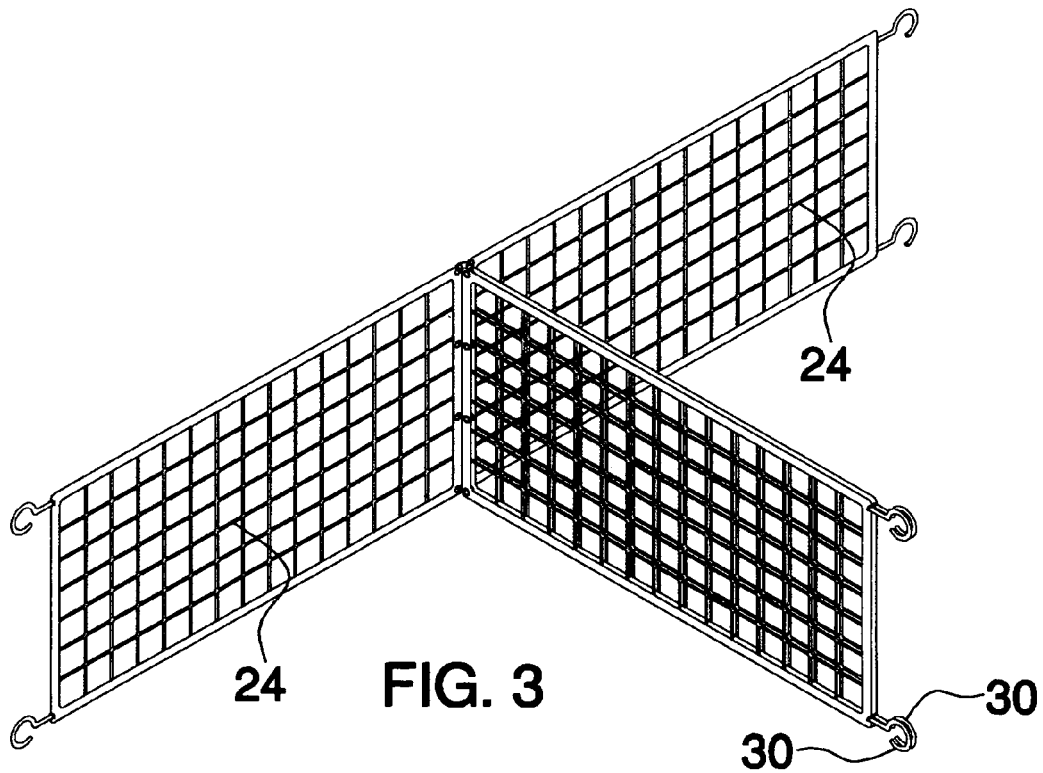
FIG. 3 is a perspective view of the present invention.
Figure 4:
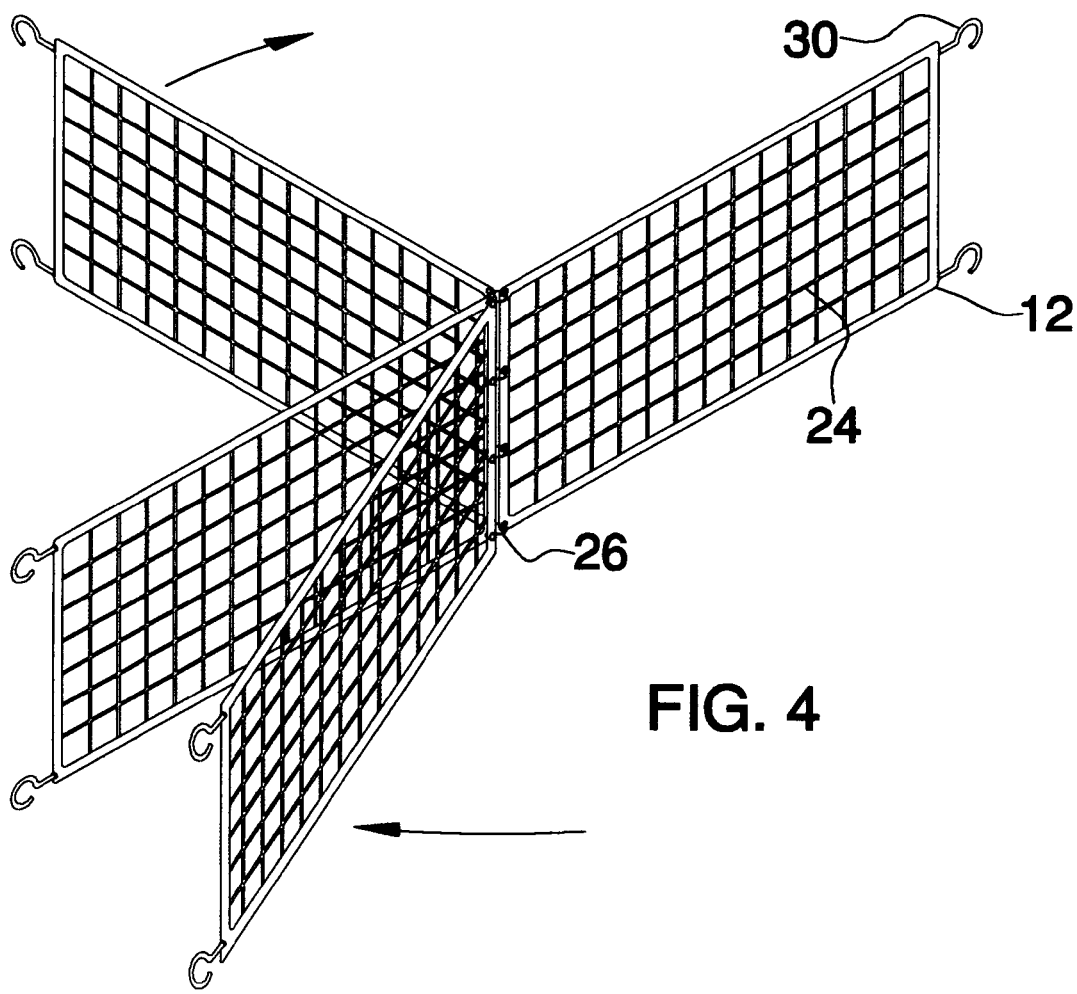
FIG. 4 is a perspective view of the present invention.
Figure 5:
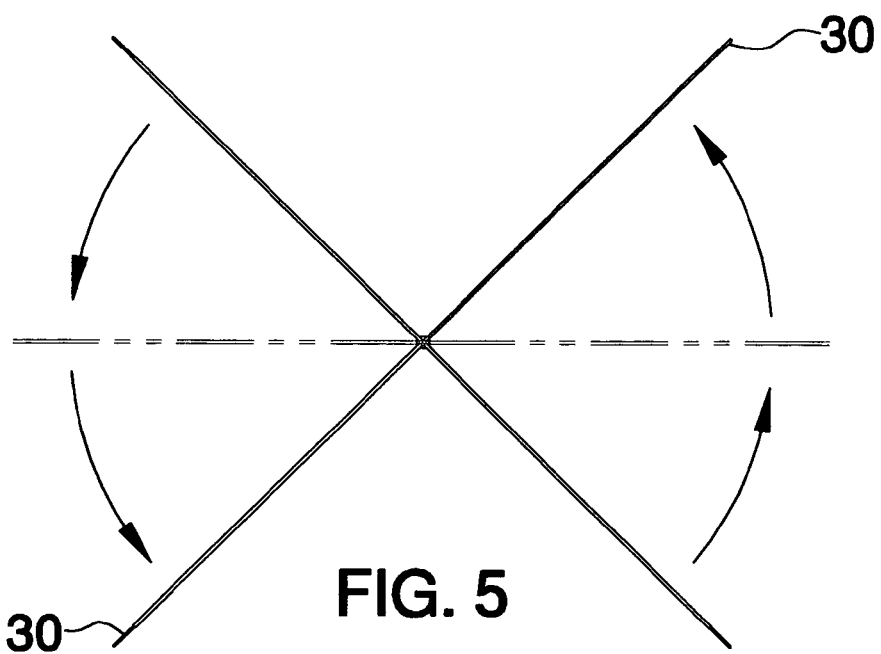
FIG. 5 is a top view of the present invention.
Figure 6:
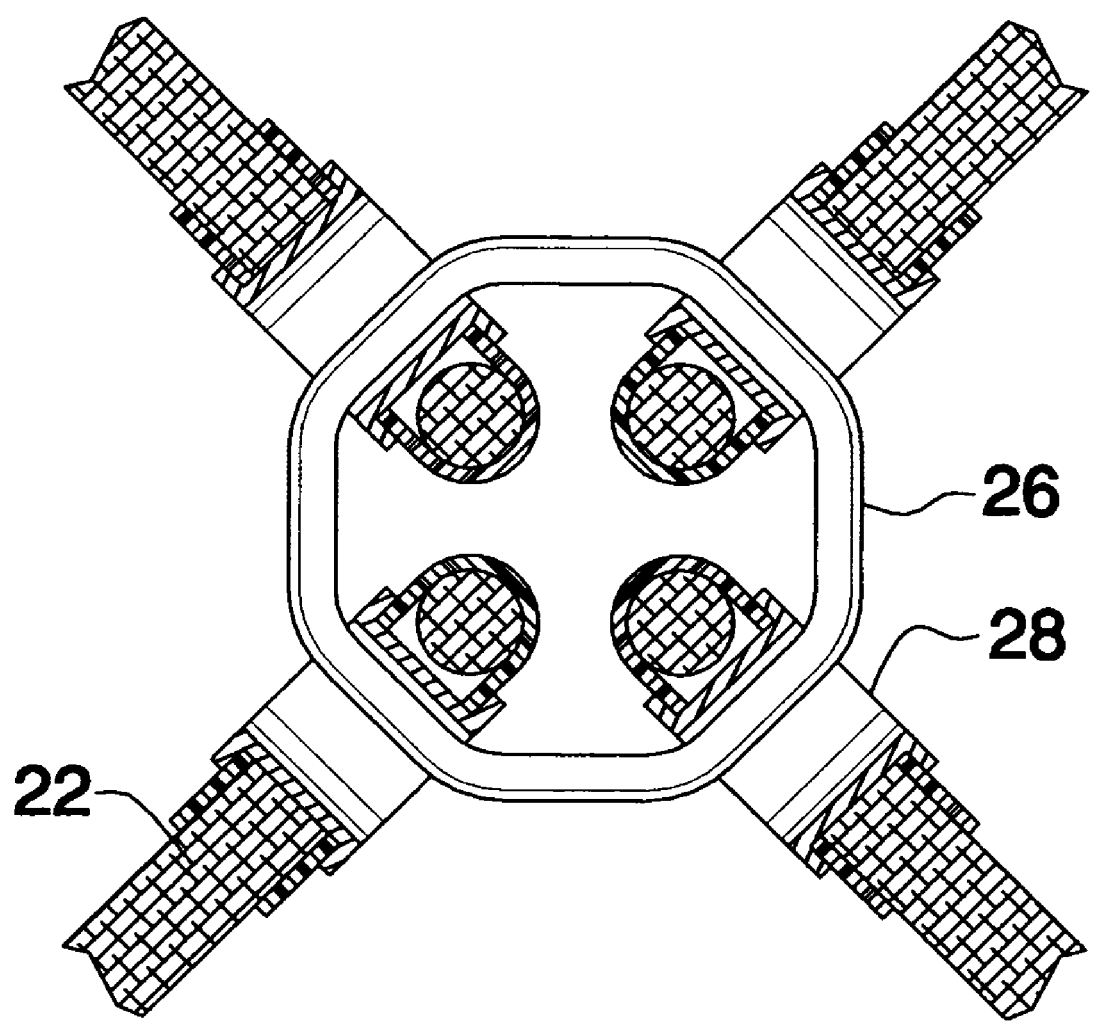
FIG. 6 is a cross-sectional view taken along line 6—6 of FIG. 2 of the present invention.

With reference now to the drawings, and in particular to FIGS. 1 through 6 thereof, a new pick-up bed partition device embodying the principles and concepts of the present invention and generally designated by the reference numeral 10 will be described.

As best illustrated in FIGS. 1 through 6, the pick-up bed dividing apparatus 10 generally comprises a plurality of flexible panels 12 that each has a first side edge 14, a second side edge 16, a top edge 18 and a bottom edge 20. Each of the panels 12 includes a perimeter frame 22 and netting 24 that is attached to and extends across the frame. The flexible panels 12 each comprise a resiliently elastic material. The plurality of panels 12 preferably includes 4 panels.

Each of a plurality of loops 26 extends through each of the panels 12 adjacent to the first side edge 14 so that the panels 12 are pivotally coupled together. The plurality of loops 26 includes at least three loops 26 spaced from each other. At least one of the loops 26 is positioned adjacent to the top edge 18 of the panels 12 and at least one of the loops 26 is positioned adjacent to the bottom edge 20 of the panels 12. Grommets 28 may be used for facilitating the extension of the loops through the perimeter frame 22 of the panels 12.

Each of a plurality of hooks 30 is attached to one of the second side edges 16 of the panels 12 so that each of the second side edges 16 each have at least two hooks 30 attached thereto. The hooks 30 are ideally positioned so that a first one of the hooks 30 on an associated one of the panels 12 is positioned adjacent to the top edge 18 and a second one of the hooks 30 on the associated one of the panels 12 is positioned adjacent to the bottom edge 20.

In use, the hooks 30 may be selectively attached to a pick-up bed 8 so that compartments are defined between spaced ones of the panels 12 as shown in FIG. 1. The hooks 30 allow for the panels 12 be attached to any hold within the pick-up bed 8 for easy retrofitting of the apparatus 10 to pick-up trucks. The loops 26 and elasticity of the panels 12 allow the user of the apparatus to form the compartments into any desired shape as shown in FIGS. 2–5.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A partitioning assembly for selectively partitioning a bed of a pick-up truck, said assembly including:
   a plurality of flexible panels, each of said panels having a first side edge, a second side edge, a top edge and a bottom edge;

a plurality of loops, each of said loops extending through each of said panels adjacent to said first side edge such that said panels are pivotally coupled together;

a plurality of hooks, each of said hooks being attached to one of said second side edges of said panels, such that each of said second side edges has at least two hooks attached thereto; and wherein said hooks may be selectively attached to the bed such that compartments are defined between spaced ones of said panels.

2. The assembly according to claim 1, wherein each of said panels includes a perimeter frame and a netting being attached to and extending across said frame.

3. The assembly according to claim 1, wherein each of said flexible panels comprises a resiliently stretchable material.

4. The assembly according to claim 1, wherein said plurality of panels includes 4 panels.

5. The assembly according to claim 1, wherein said plurality of loops includes at least three loops spaced from each other, at least one of said loops being positioned adjacent to said top edge of said panels and at least one of said loops being positioned adjacent to said bottom edge of said panels.

6. The assembly according to claim 5, wherein said hooks are positioned such that a first one of said hooks on an associated one of said panels is positioned adjacent to said top edge and a second one of said hooks on the associated one of said panels is positioned adjacent to said bottom edge.

7. The assembly according to claim 1, wherein said hooks are positioned such that a first one of said hooks on an associated one of said panels is positioned adjacent to said top edge and a second one of said books on the associated one of said panels is positioned adjacent to said bottom edge.

8. The assembly according to claim 4, wherein each of said panels includes a perimeter frame and a netting being attached to and extending across said frame.

9. The assembly according to claim 8, wherein each of said flexible panels comprises a resiliently elastic material.

10. A partitioning assembly for selectively partitioning a bed of a pick-up truck, said assembly including:

a plurality of flexible panels, each of said panels having a first side edge, a second side edge, a top edge and a bottom edge, each of said panels including a perimeter frame and a netting being attached to and extending across said frame, each of said flexible panels comprising a resiliently stretchable material, said plurality of panels including 4 panels;

a plurality of loops, each of said loops extending through each of said panels adjacent to said first side edge such that said panels are pivotally coupled together, said plurality of loops including at least three loops spaced from each other, at least one of said loops being positioned adjacent to said top edge of said panels and at least one of said loops being positioned adjacent to said bottom edge of said panels;

a plurality of hooks, each of said hooks being attached to one of said second side edges of said panels such that each of said second side edges has at least two hooks attached thereto, said hooks being positioned such that a first one of said hooks on an associated one of said panels is positioned adjacent to said top edge and a second one of said hooks on the associated one of said panels is positioned adjacent to said bottom edge; and wherein said hooks may be selectively attached to the bed such that compartments are defined between spaced ones of said panels.

\* \* \* \* \*